United States Patent
Richardson

[11] Patent Number: 6,073,946
[45] Date of Patent: Jun. 13, 2000

[54] TRAILING ARM SUSPENSION

[75] Inventor: Gregory A. Richardson, Muskegon, Mich.

[73] Assignee: Neway Anchorlok International, Inc., Muskegon, Mich.

[21] Appl. No.: 09/116,366

[22] Filed: Jul. 16, 1998

Related U.S. Application Data

[60] Provisional application No. 60/085,964, May 19, 1998, and provisional application No. 60/052,676, Jul. 16, 1997.

[51] Int. Cl.$^7$ .................................................... B60G 11/26
[52] U.S. Cl. ................................ 280/86.5; 280/124.128; 280/124.153; 280/6.156
[58] Field of Search .................... 280/124.01, 124.02, 280/124.57, 5.514, 5.515, 86.5, 124.158, 124.153, 6.155, 6.156, 124.128, 124.135; 180/209

[56] References Cited

U.S. PATENT DOCUMENTS

| | | |
|---|---|---|
| 2,890,063 | 6/1959 | Stover . |
| 3,147,024 | 9/1964 | Brockman . |
| 3,204,977 | 9/1965 | Eisenhauer et al. . |
| 3,315,978 | 4/1967 | Chieger et al. . |
| 3,354,982 | 11/1967 | Schramm . |
| 3,716,249 | 2/1973 | Schaeff . |
| 3,880,439 | 4/1975 | Wolter . |
| 4,162,082 | 7/1979 | Curry . |
| 4,181,323 | 1/1980 | Raidel . |
| 4,529,224 | 7/1985 | Raidel . |
| 4,667,974 | 5/1987 | Giese . |
| 4,756,550 | 7/1988 | Raidel . |
| 4,763,923 | 8/1988 | Raidel ..................................... 208/704 |
| 4,773,670 | 9/1988 | Raidel, II . |
| 4,802,690 | 2/1989 | Raidel ..................................... 280/713 |
| 4,881,747 | 11/1989 | Raidel . |
| 4,900,057 | 2/1990 | Raidel . |
| 4,903,976 | 2/1990 | Baillie . |
| 5,015,004 | 5/1991 | Mitchell . |
| 5,018,756 | 5/1991 | Mitchell . |
| 5,207,443 | 5/1993 | Mitchell . |
| 5,230,528 | 7/1993 | Van Raden et al. . |
| 5,244,226 | 9/1993 | Bergh . |
| 5,403,031 | 4/1995 | Gottschalk et al. . |
| 5,505,481 | 4/1996 | VanDenberg et al. . |
| 5,620,194 | 4/1997 | Keeler et al. . |
| 5,649,719 | 7/1997 | Wallace et al. . |

*Primary Examiner*—Paul N. Dickson
*Attorney, Agent, or Firm*—Radar, Fishman, Grauer & Mc Garry, An Office of Rader, Fishman & Grauer PLLC

[57] ABSTRACT

The invention is a trailing arm suspension with a steerable axle assembly having a caster angle controlling the direction at which the axle steers. A lift axle suspension or a lockout device is provided to lift the wheels from a ground engaging position or to lock the position of the wheels, respectively, permitting the operation of the vehicle in a direction opposite the direction for which the caster angle is designed. Advantageously, the lift axle suspension is of a simplified design and the trailing arm configuration is V-shaped to better absorb lateral forces.

23 Claims, 10 Drawing Sheets

TRAILING ARM SUSPENSION

CROSS REFERENCE TO RELATED APPLICATIONS

This application claims the benefit of U.S. Provisional Patent Application Ser. No. 60/085,964, filed May 19, 1998, and U.S. Provisional Patent Application Ser. No. 60/052,676 filed Jul. 16, 1997.

BACKGROUND OF THE INVENTION

1. Field of the Invention

This invention relates to steerable trailing arm suspensions for load-carrying vehicles. In one aspect, the invention relates to a steerable trailing arm suspension having a lift mechanism for raising an axle/wheel assembly to disengage the wheels from a ground surface. In a second aspect, the invention relates to a steerable trailing arm suspension with diverging trailing arms to retard lateral movement of the axle. In a third aspect, the invention relates to a steerable trailing arm suspension with a lockout device to prevent steering of the wheels.

2. Description of the Related Art

Several types of vehicles, including heavy-duty truck vehicles and the like, have multiple sets of axle/wheel suspension assemblies arranged in tandem so as to adequately support relatively heavy loads. To adjust the load support provided by these tandem suspension assemblies, it is known to employ suspension systems utilizing adjustably pressurized air springs and the like.

The suspension systems generally comprise identical suspensions mounted on opposing sides of the vehicle (preferably opposing parallel frame rails, extending along the longitudinal axis of the vehicle) and supporting the vehicle axle and wheel assemblies therebetween. The suspensions commonly comprise a hanger bracket and an air spring mounted to each frame rail and in a spaced relationship. One or more control arms, pivotally mounted to the hanger bracket, are pivotally mounted directly or indirectly to the air spring. Generally, an axle assembly is mounted to the control arms opposite the hanger bracket and the air spring mounts to the axle assembly. In this configuration, the axle assembly rotates with the control arms and the air spring dampens the motion of the axle assembly.

The axle assembly typically comprises an axle on whose opposite ends are rotatably mounted a knuckle yoke having a spindle on which a tire is mounted. The knuckles each have a tie rod arm, which are connected by a tie rod to link the movement of the opposed wheels and create a steerable axle. The steerable axle can be free steering or directly controlled.

In a steerable axle, the axle is often oriented at an angle relative to the ground to define a caster angle so that the wheels will follow the movement of the vehicle, reducing the scuffing and wearing of the tires and increasing the maneuverability of the trailer. The steerable wheels are very important during parking situations where high maneuverability is required. A disadvantage of the steerable wheel system is that when the tractor or trailer is operated in reverse, the caster angle is no longer appropriate for the direction of the travel and the wheels steer randomly and do not follow the direction of the trailer, making it difficult to back-up the trailer.

Previous solutions to controlling the steerable axle during the back-up generally fall into one of two categories. The first solution is to change the caster angle of the wheels, which is generally achieved by rotating the axle. The second solution is to lockout the wheels to prevent their rotation relative to the axle. One such lockout device is illustrated in U.S. Pat. No. 5,649,719 to Wallace et al., which discloses steering dampers connected between the steering arm and tie rod, and which has an internal valve which, upon closing, blocks fluid flow through the internal chambers of the steering damper to lock the relative position of the steering arm and the tie rods, preventing the turning of the wheels relative to the axle.

Another solution to the caster angle problem is to provide the suspension systems with a lift mechanism for lifting the suspensions from road engaging contact. When the vehicle is carrying a relatively light load, it is desirable to relieve the load transmitting relationship between the vehicle and one or more of the axle/wheel assemblies, and also to disengage the axle/wheel assembly from ground contact so as to reduce tire wear. But, the lift systems can also be used to lift the steerable axle when the vehicle is being driven in a reverse direction. To relieve load support when an air suspension system is employed, air pressure in the suspension can be reduced. To achieve disengagement of the tires from the ground surface, devices commonly referred to as axle lift mechanisms can be employed. Prior lift mechanisms utilize compressed mechanical springs located adjacent each wheel and mounted directly between the vehicle frame rails and the axle assembly. When the downward load forces exerted on the axle by the suspension system were relieved, such as through deflation of air springs, lifting forces exerted by the mechanical springs pulled the axle assembly upwardly to a raised position. An example of one such axle lift suspension is disclosed in U.S. Pat. No. 3,771,812 to Pierce et al., issued Nov. 13, 1973.

A disadvantage of the prior lift mechanisms is that the mechanical springs add a significant amount of weight to the lift axle suspension. Additionally, the constant upward force of the compressed mechanical springs add additional force to the air springs during operation, resulting in the need for a more robust air spring. The constant upward force of the compressed mechanical springs is counterproductive to the purpose of the air spring suspension, which is to keep the wheel in contact with the road surface.

Another disadvantage of previous lift axle suspensions is they have control arms that extend rearwardly from the hanger bracket and substantially parallel to the frame rails of the vehicle. Lateral forces imparted to the axle in these suspensions are resolved directly in the bushing, which pivotally connects the control arm to the hanger bracket. The bushing is designed to absorb rotational loads and the lateral loading results in unnecessarily increased wear and early deterioration of the bushings.

SUMMARY OF THE INVENTION

According to the invention, a trailing arm suspension for a vehicle comprises a frame and an axle assembly on which tires are rotatably mounted. The vehicle has a longitudinal axis to which the frame is generally parallel and the axle assembly is generally transverse. The trailing arm suspension pivotally mounts the axle assembly to the vehicle frame. The trailing arm suspension according to the invention comprises a hanger bracket adapted to mount to and extend downwardly from the vehicle frame. A first trailing arm has a first end pivotally connected to the hanger bracket and a second end adapted to connect the axle assembly. The first trailing arm moves in a first plane oriented at a first acute angle relative to the longitudinal axis of the vehicle. A second trailing arm has a first end pivotally connected to the hanger bracket and a second end adapted to connect to the axle assembly. The second trailing arm moves in a second plane oriented at a second acute angle relative to the longitudinal axis of the vehicle.

Further according to the invention, a lift axle suspension for a vehicle comprises a hanger bracket having an upper end adapted to be mounted to a vehicle frame. An axle assembly is provided and is adapted to rotatably mount tires. An upper trailing arm has a first end pivotally connected to the hanger bracket and a second end pivotally connected to the axle assembly. A lower trailing arm has a first end pivotally connected to the hanger bracket and a second end pivotally connected to the axle assembly. A lift bag is provided and is operable between an inflated and a deflated position. The lift bag has a first end connected to one of the upper and lower trailing arms and a second end connected to one of the hanger bracket and axle assembly. The hanger bracket, axle assembly, and upper and lower trailing arms define a parallelogram suspension having four corners formed by the pivotal connections of the first and second ends of the upper and lower trailing arms. As the lift bag moves from the deflated position to the inflated position, the axle assembly is moved from a lower position in which wheels on the axle assembly are adapted to be in ground engaging contact to a raised position where wheels on the axle assembly are not in ground engaging contact.

Still further according to the invention is a lockout device for a steerable axle assembly comprising an axle with opposing ends and having a longitudinal axis. Spindles, for mounting tires, are pivotally mounted to each of the opposing ends of the axle. The spindles have a longitudinal axis whose angular orientation relative to the axle of longitudinal axis changes as the spindle is pivoted. The relative movement of the spindles is linked by a tie rod having opposing ends and a tie rod arm pivotally mounted to each of the opposing ends and to one of the spindles. The lockout device comprises a pair of actuators having an arm moveable between a retracted position to an extended position. Each of the actuators is adapted to mount on one of the opposing tie rod arms and opposing tie rod ends. When the actuator arms are moved to the extended position, the ends of the actuator arms abut the axle to lock the relative movement of the spindles such that the spindle longitudinal axis is substantially parallel to the axle longitudinal axis.

BRIEF DESCRIPTION OF THE DRAWINGS

The invention will now be described with reference to the drawings wherein.

DESCRIPTION OF THE PREFERRED EMBODIMENTS

Figure 1:
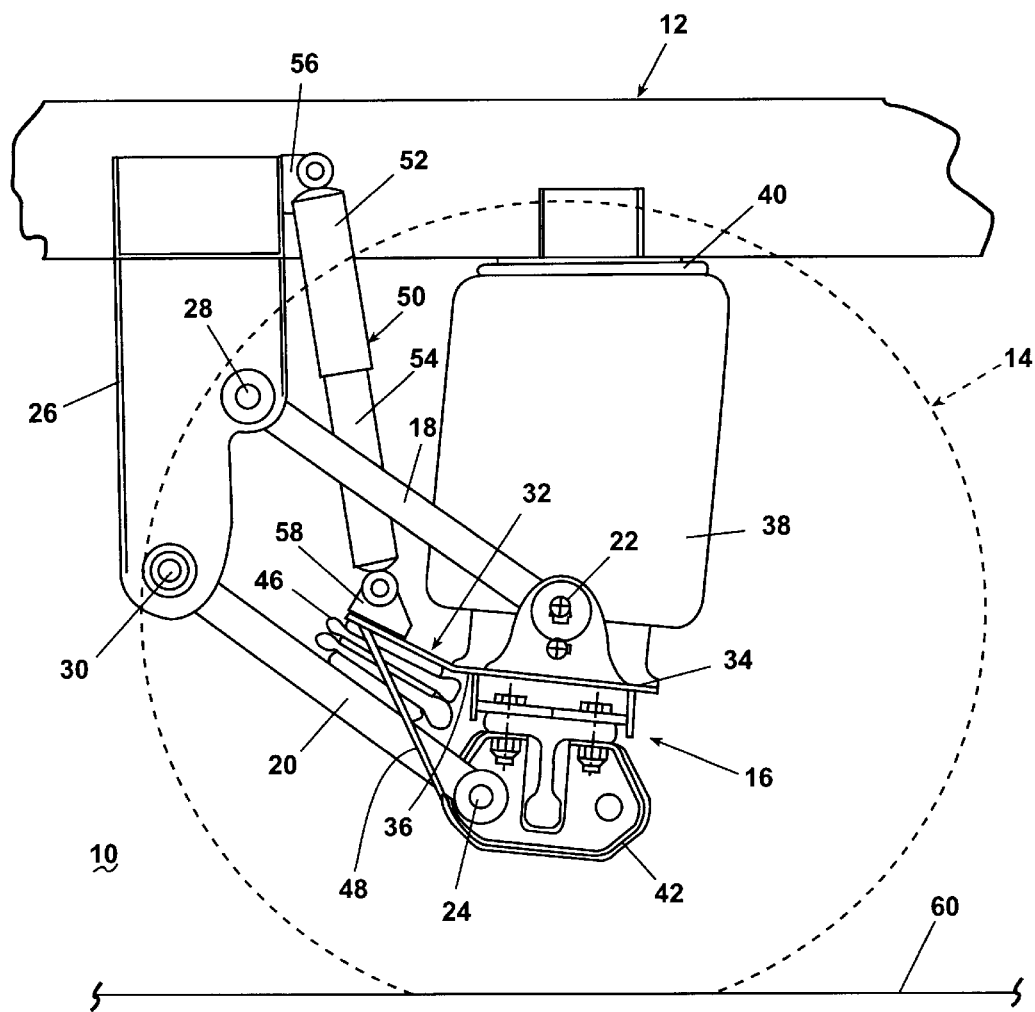
FIG. 1 is a side elevational view of a trailing arm suspension incorporating a first embodiment of a lift mechanism according to the invention in a lowered position.
Figure 2:
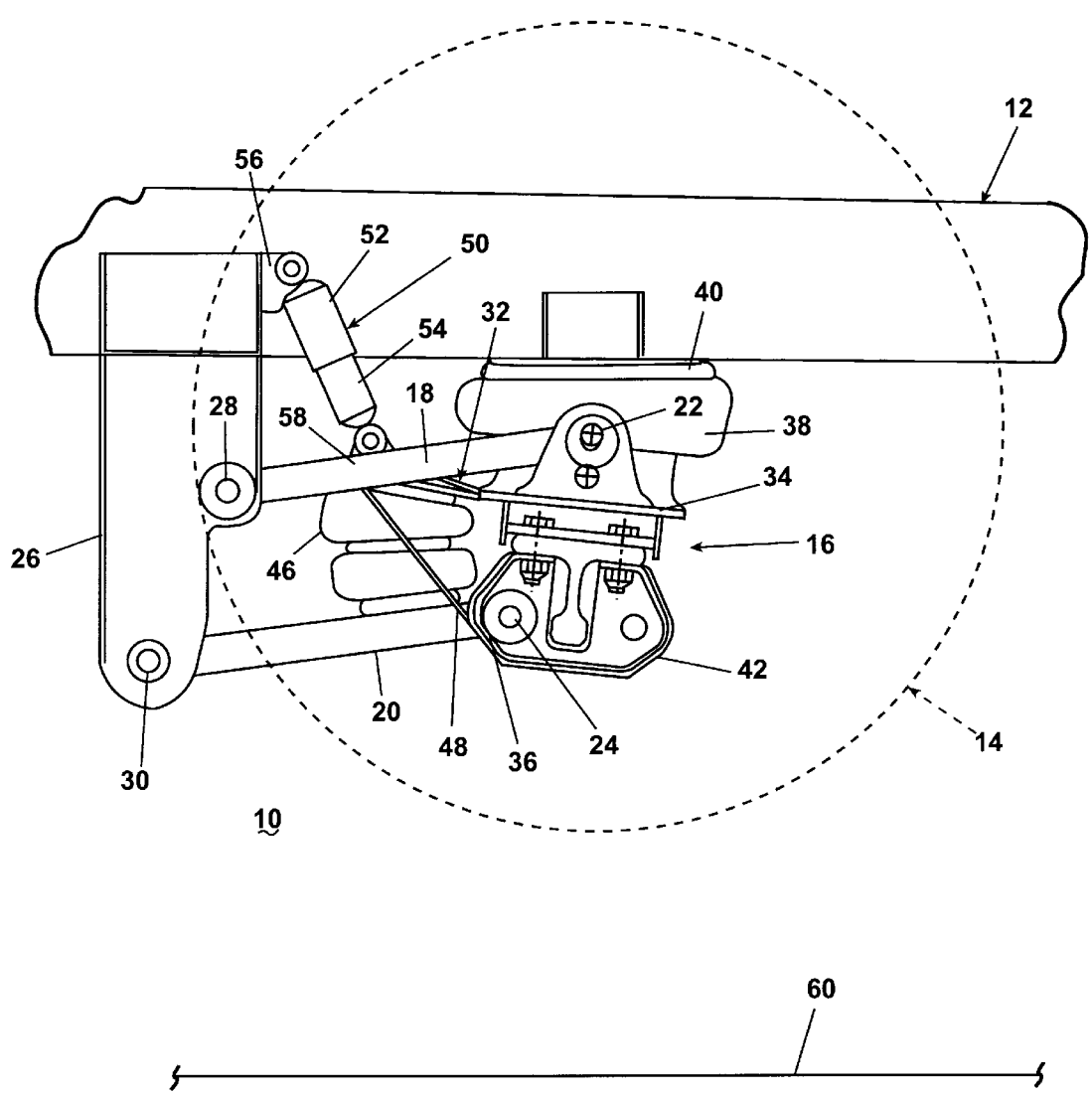
FIG. 2 is a side elevational view of the first embodiment of FIG. 1 in a raised position.
Figure 3:
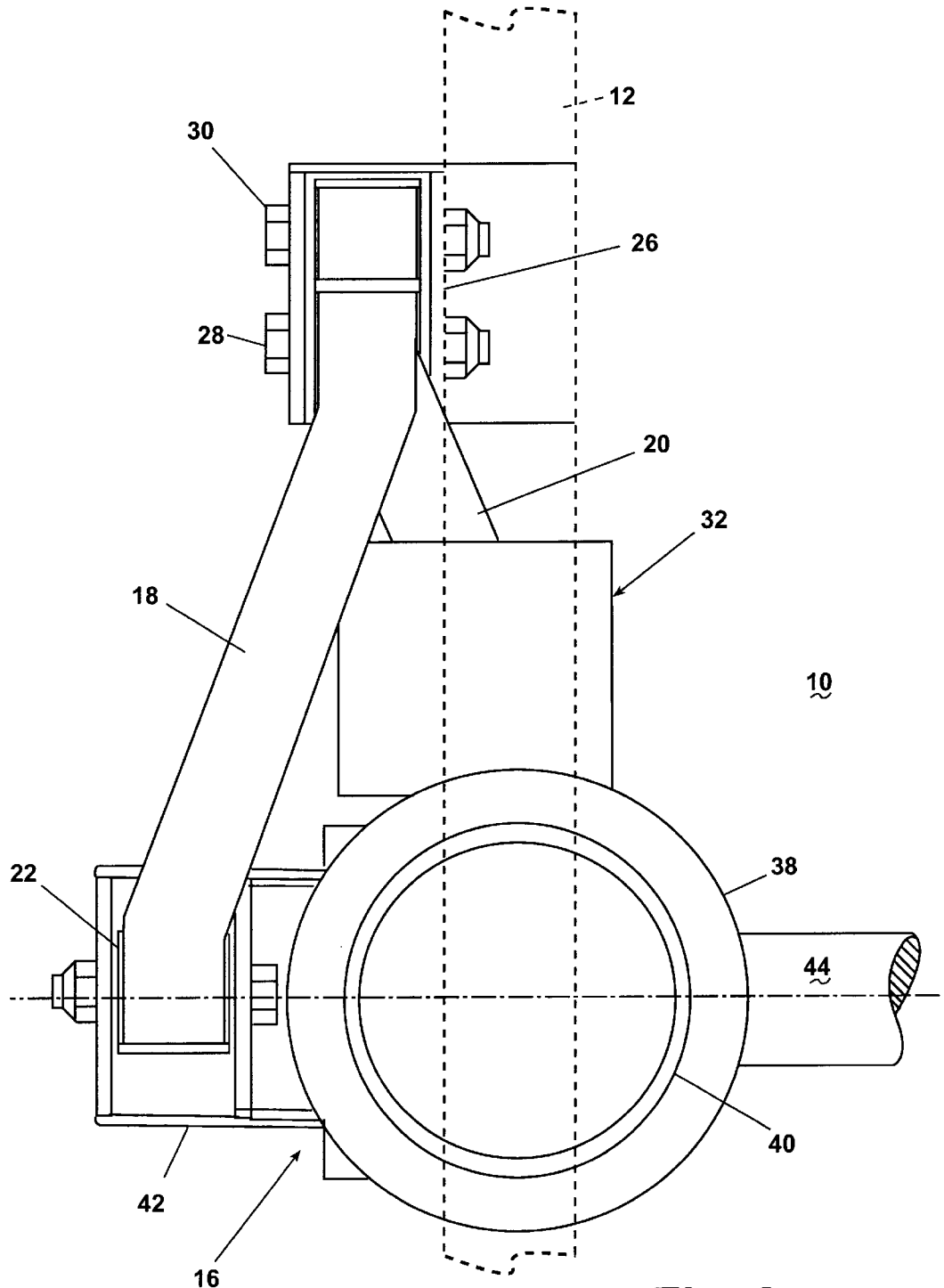
FIG. 3 is a top plan view of the trailing arm suspension of FIG. 1.

Referring now to the drawings and to FIGS. 1–3 in particular, a first embodiment of a trailing arm suspension of the axle lift suspension type 10 is shown mounted to a vehicle 12 having a wheel 14 rotatably mounted to an axle assembly 16. There are identical, opposing axle lift suspensions on opposite sides of the vehicle, which together support the axle assembly. For convenience, only one of the axle lift suspensions will be described, with it being understood the description applies to both axle assemblies.

Upper and lower portions of the axle assembly 16 are connected to first and second trailing arms 18 and 20 through conventional pivotable connections 22 and 24, respectively, such as elastomeric bushings. An opposite end of each of the first and second trailing arms 18 and 20 is mounted to a hanger bracket 26 through conventional pivotable connections 28 and 30, respectively. The hanger bracket 26, axle assembly 16 and trailing arms 18 and 20 define a parallelogram-like configuration whose sides are free to rotate about the pivotal connections 22, 24, 28, 30. The hanger bracket 26 is mounted to the vehicle 12 and depends downwardly therefrom. The axle assembly 16 includes an axle 44 and a conventional axle seat 42 mounted to the axle 41 and which mounts the bushing 24. The axle seat 42 supports an axle 44 therebetween for supporting the wheel 14. The axle 41 forms a caster angle that causes the wheel to follow the path of the vehicle when the vehicle is driven in the forward direction. However, when the vehicle is reversed, the wheels will move randomly as the caster angle is inappropriate for the reverse direction.

A plate 32 extends forwardly from the axle assembly 16 intermediate horizontal planes of the pivotable connections 22 and 24 thereof. The plate has an upper surface 34 and a lower surface 36. A conventional air spring 38 is secured at one end to the upper surface 34 of the plate 32 and at an opposite end to the vehicle 12 through a bracket 40. The axle lift suspension 10 is adapted to be movable between lowered position (FIG. 1), whereby the wheels 14 engage a ground surface 60, and a raised position (FIG. 2), whereby the wheels 14 are lifted off of the ground surface 60. The air spring 38 can have any suitable configuration, such as a rolling lobe or a bellows-type member.

An inflatable air bag 46 is secured at one end to the lower surface 36 of the plate 32 and at an opposite end to a portion of the second trailing arm intermediate the pivotable connections 24 and 30 thereof. A brace 48 extends between the lower surface 36 of the plate 32 and the axle assembly 16 to provide additional reinforcement thereto.

A conventional shock absorber 50 comprising a cylinder 52, having an axially-extendible piston 54 therein, is mounted at one end to the hanger bracket 26 adjacent the mounting of the hanger bracket 26 to the vehicle 12 through a conventional pivotable mounting 56. An opposite end of the shock absorber 50 is mounted to the upper surface 34 of the plate 32 adjacent the mounting of the lift mechanism or inflatable air bag 46 to the lower surface 36 thereof by a conventional pivotable mounting 58.

As shown in FIGS. 1-2 and in greater detail in FIG. 3, the pivotable connections 28 and 30 on the first and second trailing arms 18 and 20, respectively, are provided in a coplanar relationship relative to the longitudinal axis of the vehicle whereby the pivotable connection 30 on the second trailing arm 20 is offset forwardly from the vertical plane of the pivotable connection 28, transverse to the longitudinal axis of the vehicle, on the first trailing arm 18. From there, as seen in FIG. 3, the first and second trailing arms 18 and 20 diverge in a V-shaped configuration to their respective pivotable connections 22 and 24 on the axle assembly 16. The V-shaped offset of the first and second arms 18 and 20 provide an advantage over prior art trailing arms, usually disposed in a common vertical plane, because any lateral axle loading encountered during vehicle turns is translated into radial loads on the axle seats 42 in the axle assembly 16. Translating non-radial loading into radial loading on the axle seats 42 provides for less bushing wear and, therefore, longer bushing life.

In normal operation, the air spring 38 is inflated and the inflatable air bag 46 is deflated which positions the first and second trailing arms 18 and 20 in a lowered position so that the wheel 14 contacts the ground surface 60. The force exerted by the pressure in the air spring 38 pivots the trailing arms 18 and 20 through the pivotable connections 28 and 30 so that wheel 14 engages the ground surface 60 as shown in FIG. 1.

When the vehicle is being operated in reverse or carrying a relatively light load, it is desirable to disengage the wheel 14 from a ground surface 60. Accordingly, the pressure in the air spring 38 is exhausted and, thus, the load forces normally exerted on the trailing arms 18 and 20 by the vehicle 12 are correspondingly relieved. Concurrently, pressurized air is supplied to the inflatable air bag 46 which causes the inflatable air bag 46 to expand and bear against the lower surface 36 of the plate 32 of the axle assembly 16. As the inflatable air bag 46 expands, a force is applied to both the axle assembly, via the plate, and the lower trailing arm 220, which tends to rotate them both radially apart relative to the pivotable connection 24. Since the axle assembly and the lower trailing arm are connected with the hanger bracket and the upper trailing arm 18 in the parallelogram configuration, the lower trailing arm 20 and axle assembly 16 cannot freely rotate relative to the pivotable connection 24 in response to the force from the lift bag. Instead, the lift bag force acts to rotate the trailing arms upwardly to lift the wheel 14 off the ground. Correspondingly, the axle assembly 16 and the attached wheels 14 are moved to an appropriately raised position as shown in FIG. 2 whereby the wheels 14 are raised from the ground surface 60.

When it is desired to once again transmit load from the vehicle 12 to the wheel 14 and axle assembly 16, the previously described air spring 38 can be inflated as the inflatable air bag 46 is deflated so as to exert downward forces on the end of the trailing arms 18 and 20 adjacent their respective pivotable connections 22 and 24. The downwardly exerted forces exerted on the first and second trailing arms 18 and 20 are sufficient to rotate the trailing arms 18 and 20 clockwise through their respective pivotable connections 28 and 30 so that the wheels 14 again contact the ground surface 60.

Figure 4:
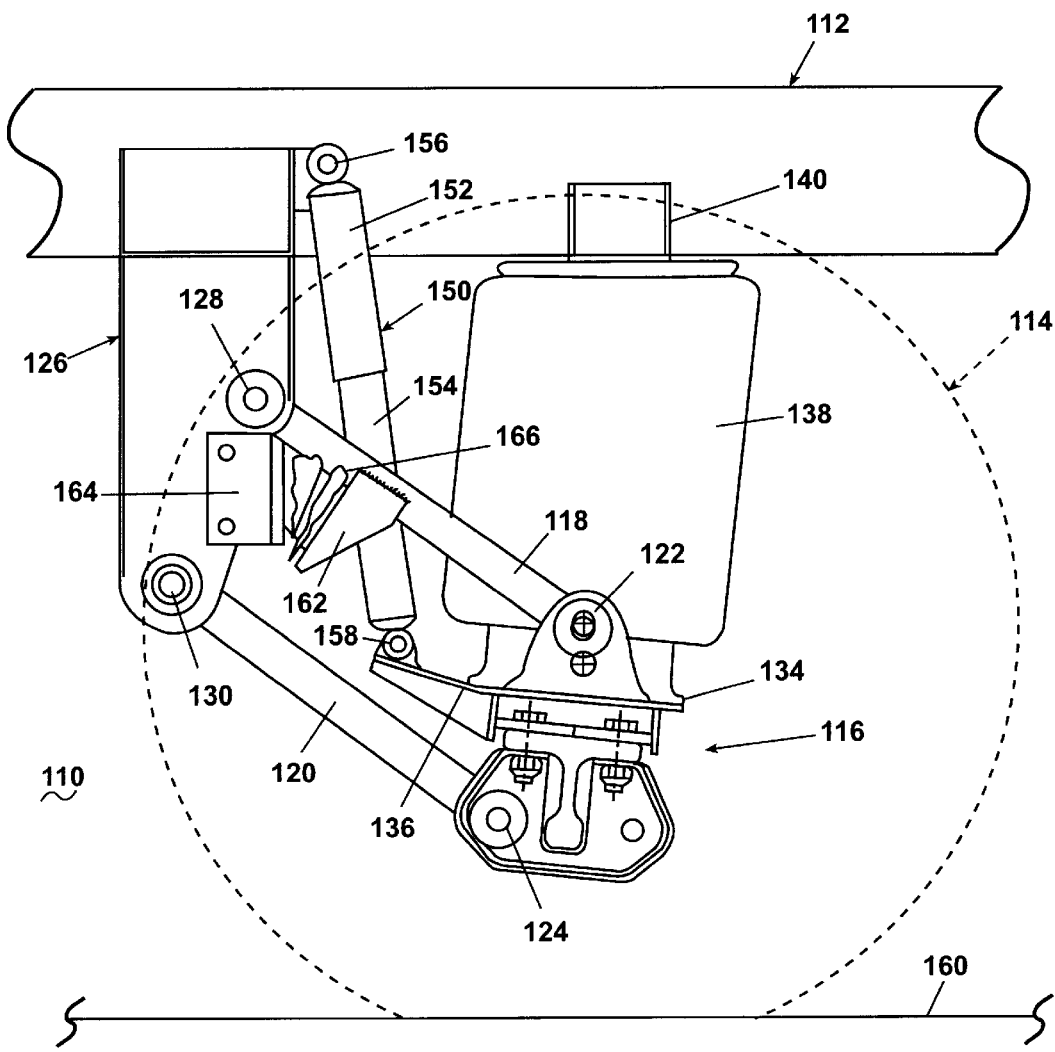
FIG. 4 is a side elevational view of a trailing arm suspension incorporating a second embodiment of an axle lift mechanism according to the invention in a lowered position.
Figure 5:
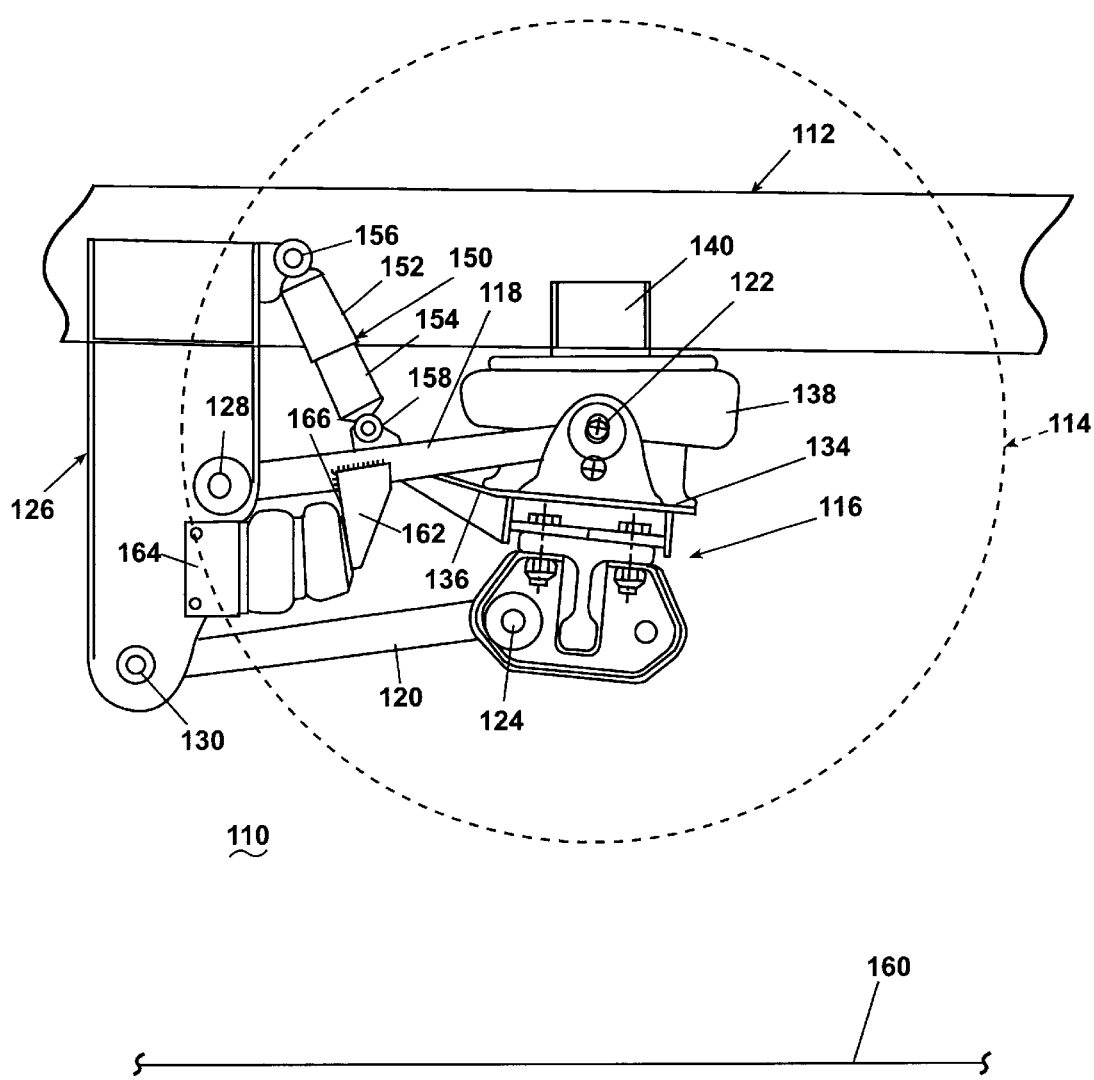
FIG. 5 is a side elevational view of the second embodiment of FIG. 4 in a raised position.
Figure 6:
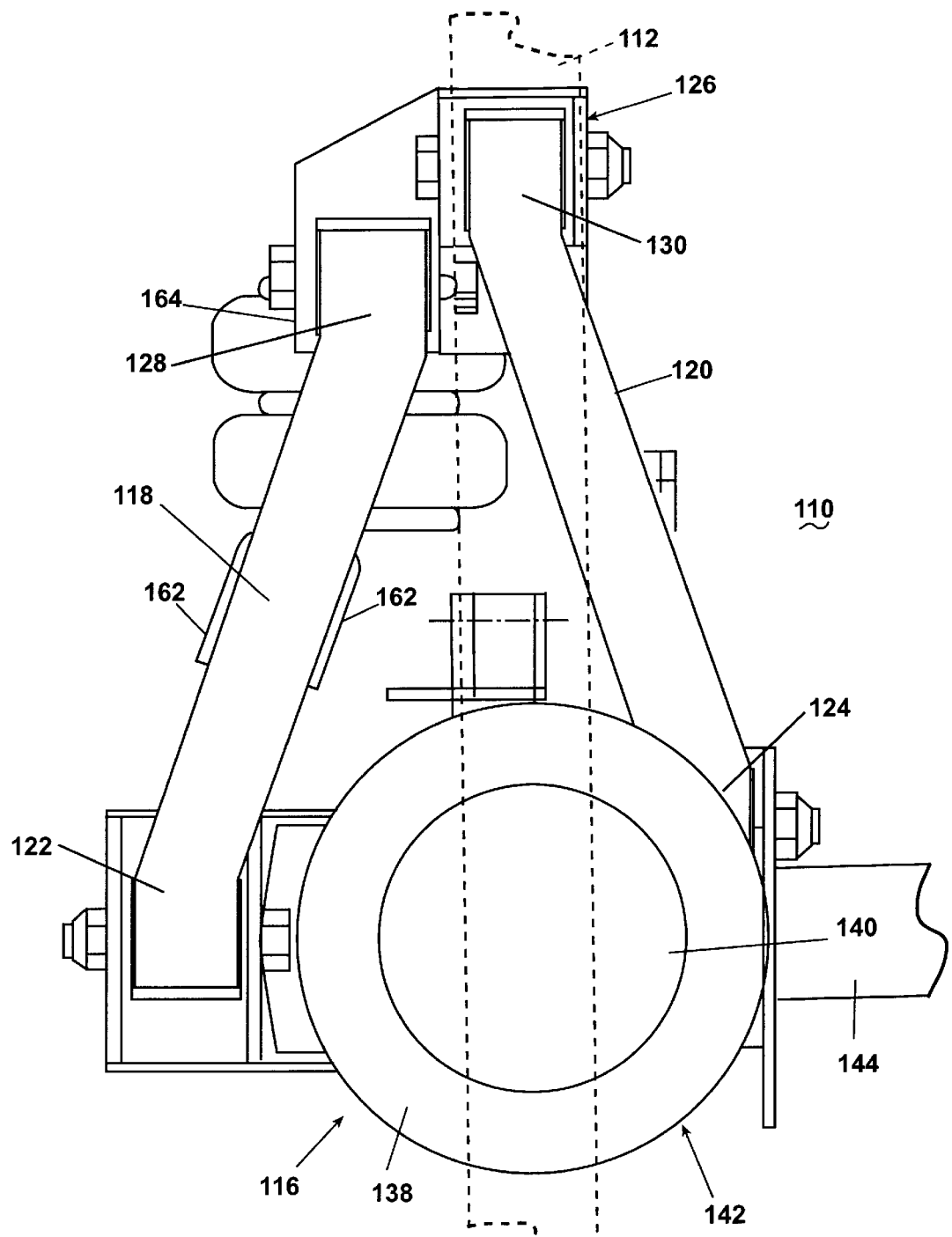
FIG. 6 is a top plan view of the trailing arm suspension of FIG. 4.

Referring now to FIGS. 4–6, a second embodiment of an axle lift suspension 110 is shown mounted to a vehicle 112 having a wheel 114 rotatably mounted to an axle assembly 116. Upper and lower portions of the axle assembly 116 are connected to first and second trailing arms 118 and 120 through conventional pivotable connections 122 and 124, respectively. An opposite end of each of the first and second trailing arms 118 and 120 are mounted to a hanger bracket 126 through conventional pivotable connections 128 and 130, respectively. The hanger bracket 126 is mounted to the vehicle 112 and depends downwardly therefrom. An axle assembly 116 is mounted to either side of the vehicle 112 and includes an axle 144 and a conventional axle seat 142 which rotatably supports axle 144 therebetween for supporting the wheels 114. The axle 144 defines a caster angle .

A plate 132 extends forwardly from the axle assembly 116 intermediate horizontal planes of the pivotable connections 122 and 124 thereof. The plate 132 has an upper surface 134 and a lower surface 136. A conventional air spring 138 is secured at one end to the upper surface 134 of the plate 132 and at an opposite end to the vehicle 112 through a bracket 140. The axle lift suspension 110 is adapted to be movable between lowered position (FIG. 4), whereby the wheels 114 engage a ground surface 160 and a raised position (FIG. 5) whereby the wheels 114 are lifted off of the ground surface 160. The air spring 138 can have any suitable configuration, such as a rolling lobe or a bellows-type member.

The first trailing arm 118 has a flange 162 which depends from an underside portion thereof intermediate the pivotable connections 122 and 128. In addition, a mounting plate 164 is secured to the hanger bracket 126 intermediate the pivotable connections 128 and 130. A lift mechanism or inflatable lift bag 146 is secured at one end to a forward surface 166 of the flange 162 and at an opposite end to the mounting plate 164 on the hanger bracket 126.

A conventional shock absorber 150 comprising a cylinder 152 having an axially-extendible piston 154 therein is mounted at one end to the hanger bracket 126 adjacent the mounting of the hanger bracket 126 to the vehicle 112 through a conventional pivotable mounting 156. An opposite end of the shock absorber 150 is mounted to the upper surface 134 of the plate 132 adjacent the mounting of the inflatable lift bag 146 to the lower surface 136 thereof by a conventional pivotable mounting 158.

As shown in FIGS. 4-5 and in greater detail in FIG. 6, the pivotable connections 128 and 130 on the first and second trailing arms 118 and 120, respectively, are provided in a vertically-spaced relationship whereby the pivotable connection 130 on the second trailing arm 120 is horizontally aligned with the pivotable connection 128 on the first trailing arm 118. From there, as seen in FIG. 6, the first and second trailing arms 118 and 120 diverge in a V-shaped configuration to their respective pivotable connections 122 and 124 on the axle assembly 116. The V-shaped offset of the first and second arms 18 and 20 provide additional structural reinforcement to the axle lift suspension as discussed in the previous embodiment.

The second embodiment of the lift mechanism operates substantially similarly to the first embodiment, except the lift bag forces are applied between the hanger bracket and the upper trailing arm. In normal operation, the air spring 138 is inflated and the inflatable lift bag 146 is deflated which causes the first and second trailing arms 118 and 120 to be positioned in a lowered position so that the wheel 114 contacts the ground surface 160. The force exerted by the pressure in the air spring 138 pivots the trailing arms 118 and 120 through the pivotable connections 128 and 130 so that wheel 114 engages the ground surface 160 as shown in FIG. 4.

To disengage the wheel 114 from a ground surface 160, the pressure in the air spring 138 is decreased and, thus, the load forces normally exerted on the trailing arms 118 and 120 by the vehicle 112 are correspondingly relieved. Concurrently, pressurized air is supplied to the inflatable lift bag 146 which causes the inflatable lift bag 146 to expand rearwardly and bear against the forward surface 166 of the flange 162. As the inflatable lift bag 146 expands, the first and second trailing arms 118 and 120 are rotated counterclockwise about their respective pivotable connections 128 and 130 because of the rearward urging of the inflatable lift bag 146 against the flange 162. Correspondingly, the axle assembly 116 and the attached wheels 114 are moved to an appropriately raised position as shown in FIG. 5 whereby the wheels 114 do not contact the ground surface 160.

When it is desired to once again transmit load from the vehicle 112 to the wheel 114 and axle assembly 116, the previously described air spring 138 can be inflated as the inflatable lift bag 146 is deflated so as to exert downward forces on the end of the trailing arms 118 and 120 adjacent their respective pivotable connections 122 and 124. The downwardly exerted forces exerted on the first and second trailing arms 118 and 120 are sufficient to rotate the trailing arms 118 and 120 clockwise through their respective pivotable connections 128 and 130 so that the wheels 114 again contact the ground surface 160.

Figure 7:
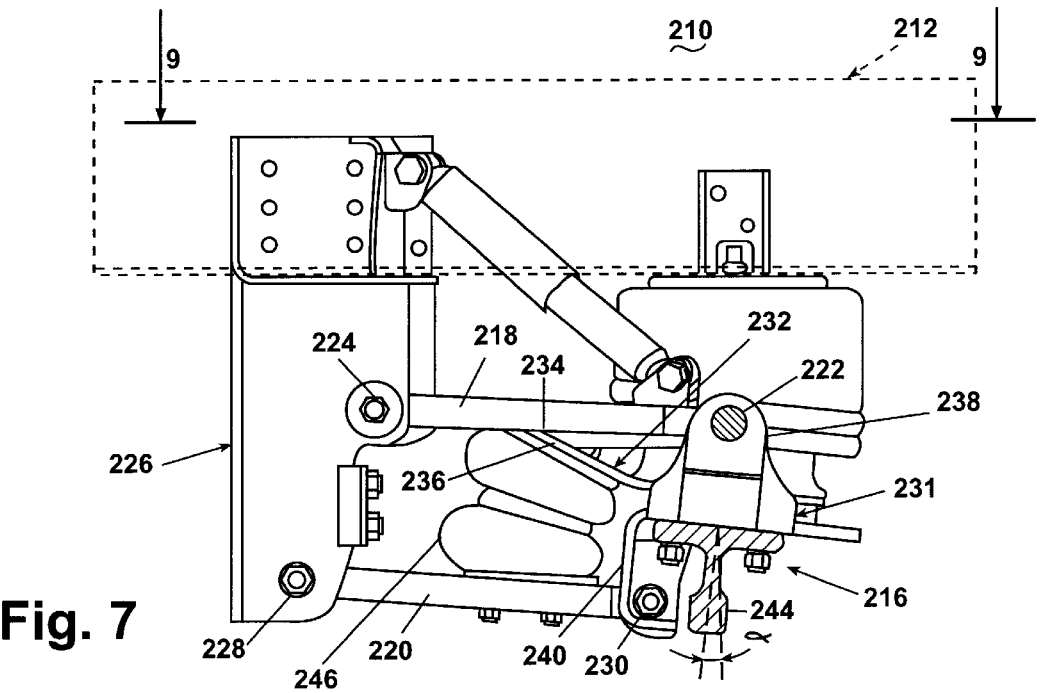
FIG. 7 is a side elevational view of a trailing arm suspension incorporating a third embodiment of an axle lift mechanism according to the invention in a lowered position.
Figure 8:
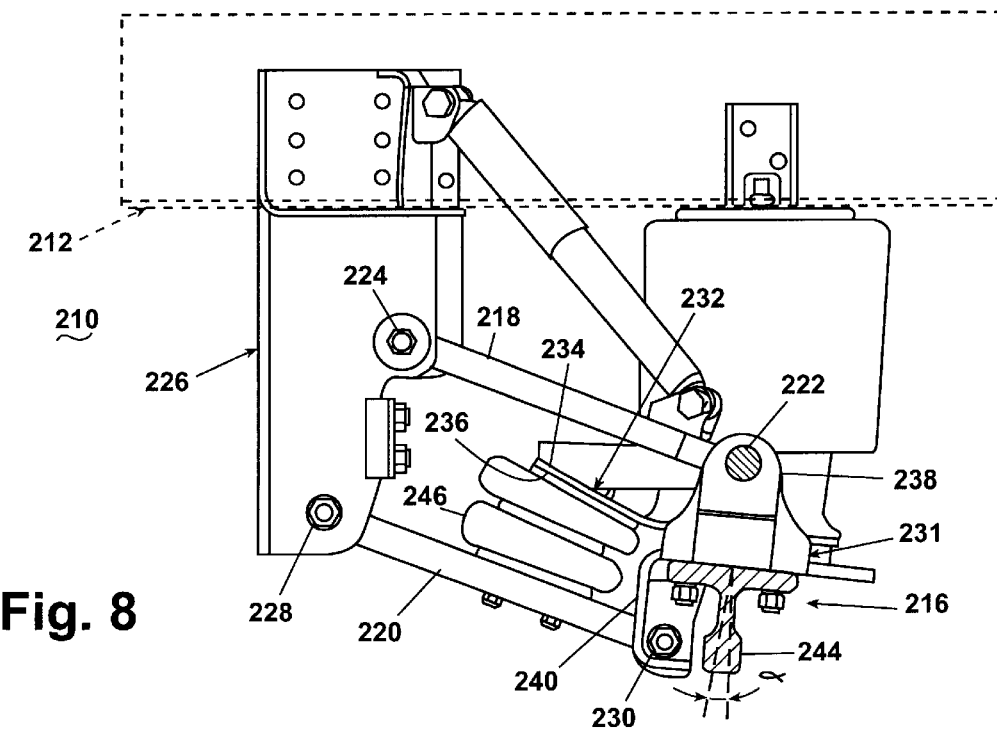
FIG. 8 is a side elevational view of the third embodiment of FIG. 7 in a raised position.
Figure 9:
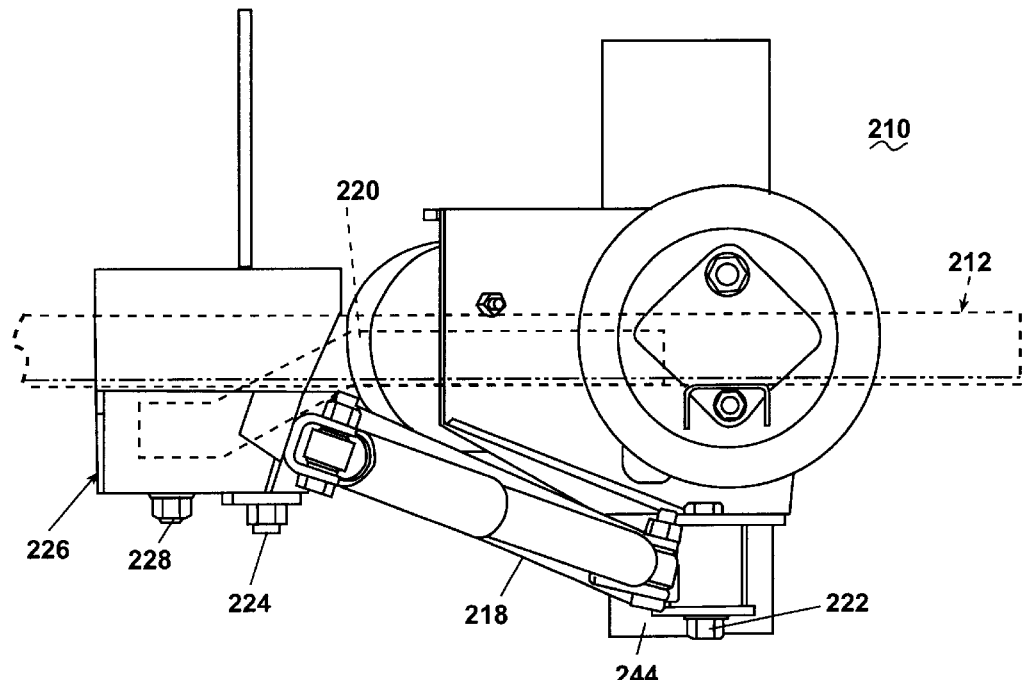
FIG. 9 is a top plan view of the trailing arm suspension of FIG. 7.
Figure 10:
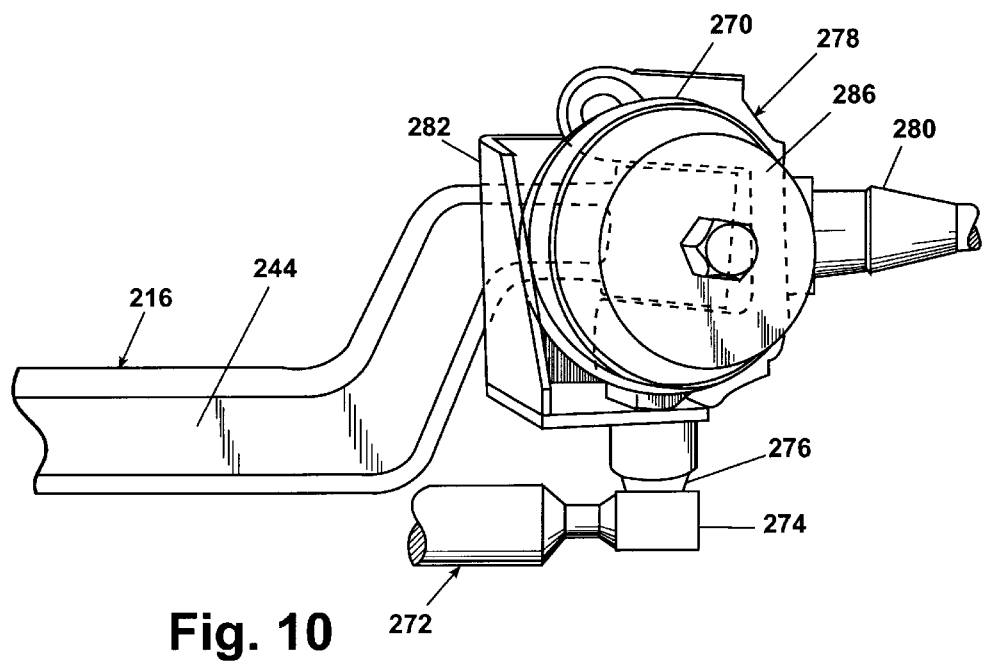
FIG. 10 is a perspective view of a portion of the trailing arm suspension of FIG. 7 and illustrates a lockout device according to the invention.

Referring now to FIGS. 7–9, there is illustrated a third embodiment lift suspension 210 mounted to a vehicle 212 to support an axle assembly 216 on which is mounted wheel (not shown). The axle assembly 216 is preferably steerable or self-steering.

The trailing arm suspension 210 comprises first and second trailing arms 218, 220 pivotally connecting the axle assembly 216 to a hanger bracket 226, depending downwardly from a frame rail of the vehicle 212. The trailing arms 218 and 220 have first and second opposing ends that are preferably connected to the hanger bracket 226 and the axle assembly 216, respectively, by pivotable connections 220, 222 and 228, 230. The pivotable connections are preferably elastomeric bushings of a type well known in the field of the invention.

The axle assembly 216 comprises a bracket 231 for mounting various components of the suspension to the axle assembly 216. The bracket 231 mounts to an axle 244 and comprises a plate 232, first trailing arm connection 238 and second trailing arm connection 240. The plate 232 has an upper surface 234 and a lower surface 236. The first and second trailing arm connections 238 and 240 are adapted to mount the pivotable connections 228, 230 to thereby secure the second ends of the trailing arms 218 and 220 to the axle assembly 216. An air spring 242 is mounted on one end to the upper surface 234 of the plate 232 and at an opposite end to a plate 243 connected to the frame rail of the vehicle 212. The axle forms a caster angle .

As best seen in FIG. 9, when viewed from above, the control arms 218, 220 diverge from their respective pivotable connections 222, 224 on the hanger bracket 226 to their respective pivotable connections 228, 230 on the mounting bracket 231. The diverging or V-shaped geometry of the control arms 218, 220 translates lateral forces applied to the axle assembly into rotational forces that can be dampened by the pivotable connections.

A lift mechanism comprises a lift bag 246 mounted between the lower surface 236 of the plate 234 and the lower trailing arm 220. Preferably, a brace 248 extends from the mounted bracket 231 to the upper surface of the plate 232 to provide additional structural support to the plate 232.

The trailing arm suspension 210 further includes a shock absorber 250 comprising a cylinder 252 and a piston 254 pivotally mounted to the vehicle frame by pivotable connection 256 and to the mounting bracket 243 by pivotable connection 258.

In operation, to raise the lift axle suspension 210 from the ground engaging position illustrated in FIG. 7 to the raised position illustrated in FIG. 8 for reverse operation or with a light load, the lift bag 246 is inflated, which applies a force between the lower trailing arm 220 and the axle assembly 216, via the plate 232. The force applied between the axle assembly 216 and the lower trailing arm 220 tends to compress or flatten the parallelogram structure of the hanger bracket 246, upper trailing arm 218, lower trailing arm 220, and axle assembly 216 as described above for the first embodiment. Since the one end of the trailing arms 218 and 216 are fixed vertically and horizontally relative to the hanger bracket 246, the applied force will urge the axle assembly upwardly to rotate the trailing arms 218 and 220 about the pivotable connections 222 and 224 to raise the axle assembly 216 and lift the wheels 214 off the ground.

The lift axle suspension 210 according to the invention is advantageous over prior designs in that the lift axle suspension 210 eliminates active mechanical lift springs which bias the axle assembly 216 upwardly. Therefore, the lift axle suspension 210 according to the invention achieves a reduction in weight because the mechanical springs are substantially heavier than the lift bag 246 and the connecting plate 232. Additionally, the lift axle suspension 210 reduces the force that the air spring 242 must accommodate in response to movement of the axle assembly 216 because the air spring 242 does not have to compensate for the constant upward spring force of the prior art mechanical spring designs.

Another advantage of the lift axle suspension 210 is that the upper trailing arm and the lower trailing arm 218, 220 diverge relative to the hanger bracket to form a V-shaped configuration, when viewed from above as illustrated in FIG. 9. The V-shaped geometry converts a portion of the lateral forces applied to the axle assembly 216 into rotational forces that can be better absorbed by the pivotable connections 222 and 224. In prior designs, the trailing arms extended perpendicular relative to the axis of rotation of the pivotable connection, resulting in almost all the lateral loads applied to the trailing arm through the axle assembly 216 being applied directly as bending moments to the pivotable connections, which are not designed to absorb or dampen lateral loads but are designed to dampen or absorb rotational loads.

Referring now to FIGS. 10–13, there is a fourth embodiment of the invention. Unlike the previous embodiments, the fourth embodiment does not rely on lifting the suspension to permit reverse operation, but locks the position of the wheels in reverse. However, the lockout device of the fourth embodiment can be applied to any steerable axle assembly having a lift suspension. Therefore, for simplicity, the lockout device will be described in the context of the suspension of the third embodiment.

According to the invention, a lockout device 270 is provided for the steerable axle assembly 216. As the steerable axle assembly is symmetrical with respect to the longitudinal axis of the vehicle and there are complementary lockout devices 270 on opposite sides of the axle assembly 216. Only one of the lockout devices 270 and one side of the axle assembly 216 are illustrated with the understanding that the description applies also to a second lockout device on the opposite side of the axle assembly 216.

The steerable axle assembly 216 comprises a tie rod 272 having a terminal end 274 to which is rotatably mounted one end of a tie rod arm 276. The other end of the tie rod arm 276 pivotally mounts to a knuckle 278, which is pivotally mounted to the end of the axle 244 in a well known manner. A spindle 280 extends from the knuckle and is adapted to mount the wheel 214. The axle 244 is preferably orientated at an angle offset from the vertical (FIG. 7) to create a caster angle β for the wheel 214 mounted to the spindle 280. The caster angle provides for the wheel to freely steer in the direction of the vehicle when the vehicle is moved in a forward direction. However, if the vehicle is moved in a rearward direction, the caster angle is not effective and the wheels will steer in random directions.

The lockout device 270 is provided to prevent the wheels from steering in random directions when the vehicle is driven in reverse. The lockout device 270 is mounted to the tie rod arm 276 by a mounting bracket 282. The lockout device 270 is preferably an air operated actuator having a housing 286 from which extends a pin 288. The actuator is well known in the field of vehicle suspensions and will be described briefly. In general, the actuator includes an internal diaphragm separating the interior of the housing 286 into two chambers. In one of the chambers, there is a plate abutting the diaphragm and on which is provided the pin 288 that through an opening in the housing 286. A spring is disposed between a portion of the housing and the plate to bias the plate in such a manner so that the pin 288 is urged to the retracted position. The second chamber comprises an air inlet that is adapted to receive compressed air from a source in the vehicle. As compressed air is added to the second chamber, the force of the compressed air overcomes the spring in the first chamber to extend the pin out of the housing.

The pin 288 has a longitudinal axis along which the pin is moved in response to the pressurized air entering the housing. Preferably, the pin longitudinal axis does not pass through the pivot axis. Thus, when the pin is extended out of the housing, contact with the axle will apply a force to the lever arm and generate a moment to pivot the spindle via the relative pivoting of the tie rod and tie rod arm.

Figure 11:
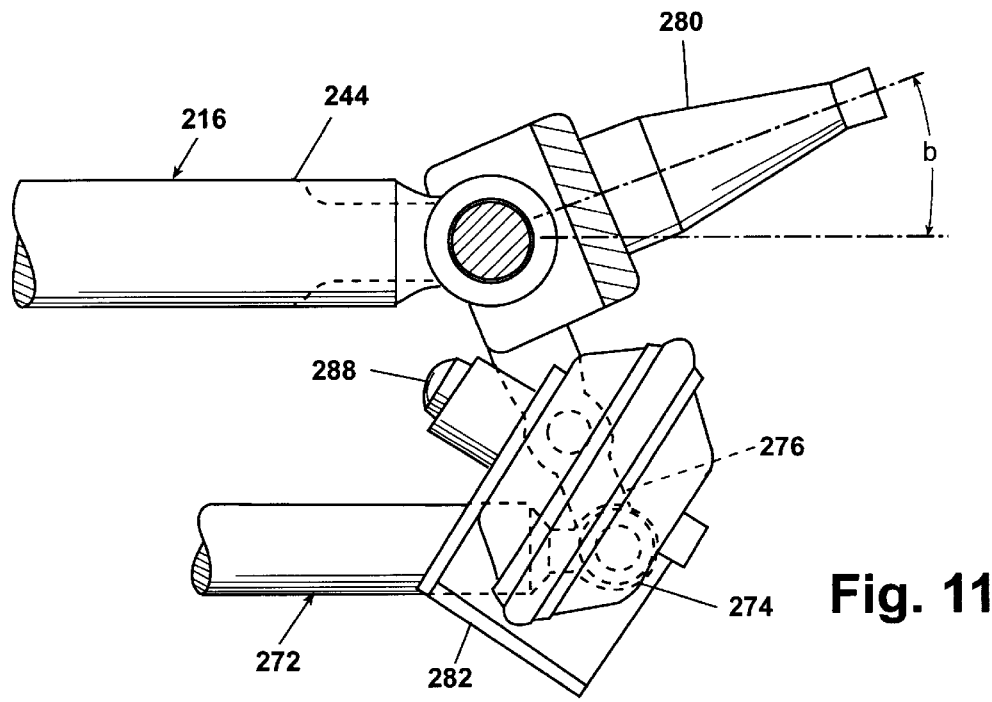
FIG. 11 is a top plan view of the lockout device of FIG. 10 with the lockout device in the unlocked position and the wheel spindle in an extreme forward position.
Figure 12:
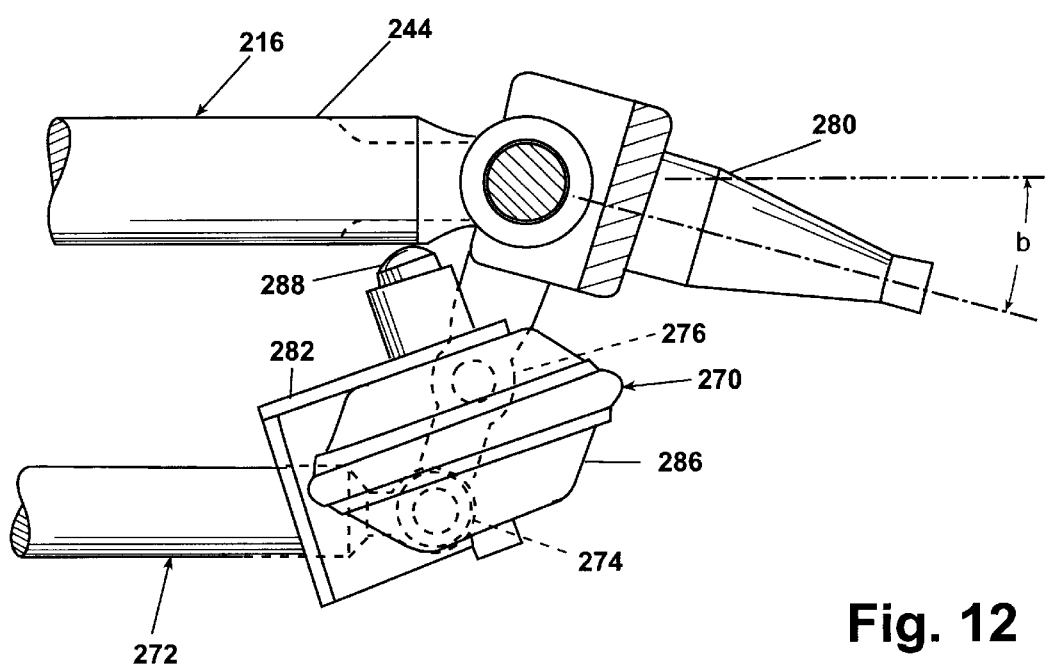
FIG. 12 is a top plan view of the lockout device of FIG. 10 with the lockout device in the unlocked position and the wheel spindle in an extreme rearward position.
Figure 13:
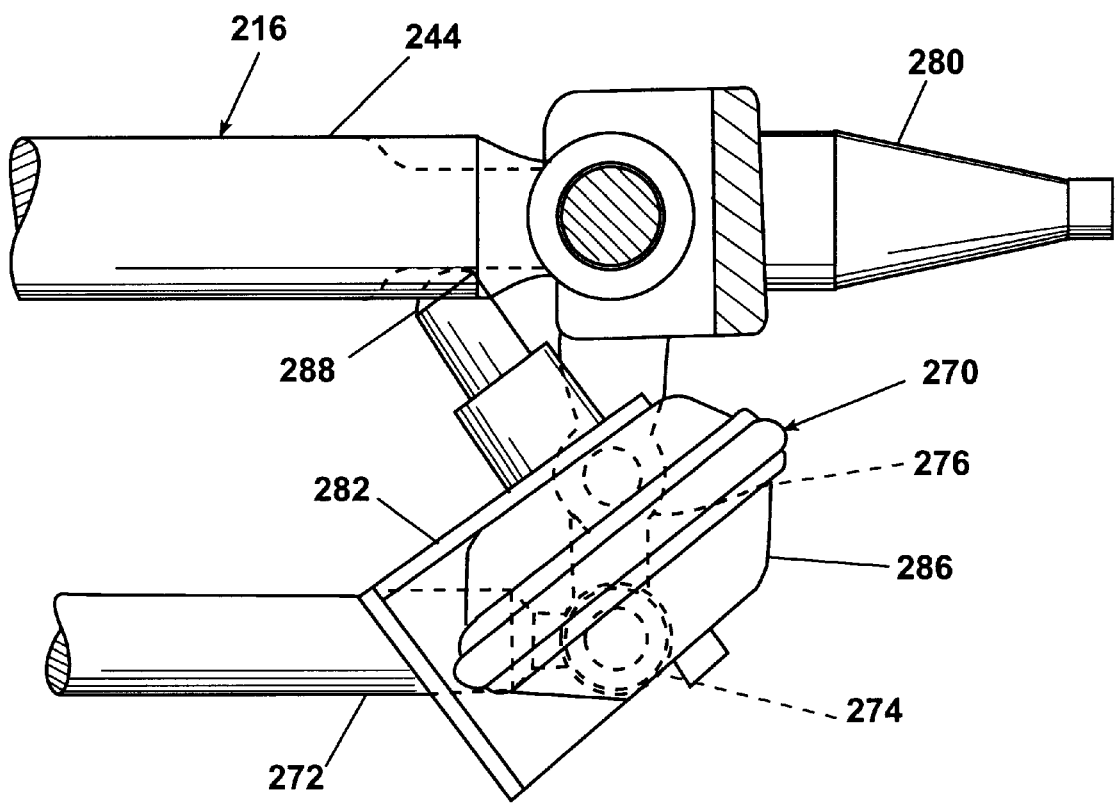
FIG. 13 is a top plan view of the lockout device of FIG. 10 illustrating the lockout device in the locked position.

As best seen in FIGS. 11 and 12, the spindle 280 is free to rotate relative to the longitudinal axis of the axle 244 through a turn angle β. When the spindle is at its most forward position (FIG. 11) the pin does not contact the axle, either in the extended or retracted position. When the spindle is at its rearward maximum turn angle β (FIG. 12), the pin 288 just abuts or is very close to the axle 244 when it is retracted. As best seen in FIG. 13, when the pin is extended, the pin contacts the axle 244 when the longitudinal axis of the spindle 280 aligns with the longitudinal axis of the axle 244. In other words, when the wheel is parallel to the vehicles longitudinal axis, the extended pin contacts the axle. This position is defined as the neutral position.

In operation, the pin 288 of the actuator 284 is normally maintained in the retracted position. When the pin is in the retracted position, the spindle 280 is free to rotate throughout its entire turn angle β. However, when it is desired to drive the truck or vehicle in reverse, the pin 288 is extended. Since there are two opposing actuators 284 with their corresponding pins 288, as the pins are extended, at least one of the pins will contact the axle 244. The actuators preferably have sufficient force so that the actuator whose pin 288 is in contact with the axle 244, will rotate the tie rod arm to move the wheels to the neutral position. Furthermore, since there are two actuators and pins 288, which contact the axle 244 in the neutral position, both wheels are locked in the neutral position. When the wheels are locked in the neutral position, the vehicle can be driven in reverse or backed up without the random rotation of the wheels that would otherwise occur because of the caster angle.

Preferably, the actuators 284 are mounted via the bracket 282 to the junction of the tie rod in the tie rod arm so that the pins 288 form a 45° angle relative to the longitudinal axis of the axle 244, when the tires are in the neutral position. However, a 45° angle is specific to the geometry shown and can vary with different steering geometries.

The advantage of the lockout device of the invention, is that it does not add substantial weight to the lift axle suspension and is not unnecessarily complex like some prior devices, especially those that change the caster angle when going from forward to reverse, which requires rotating the axle.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. A trailing arm suspension for a vehicle having a longitudinal axis and comprising a frame oriented generally parallel to the vehicle longitudinal axis and an axle assembly rotatably mounting ground engaging tires, the axle assembly adapted to be oriented generally transverse to the vehicle longitudinal axis, and the trailing arm suspension adapted to pivotally mount the axle assembly to the vehicle frame, the trailing arm suspension comprising:

a hanger bracket adapted to mount to and extend downwardly from a vehicle frame;

a first trailing arm having a first end pivotally connected to the hanger bracket for movement of the first trailing arm in a first plane at a first acute angle substantially greater than zero relative to the vehicle longitudinal axis when the trailing arm suspension is mounted to the vehicle frame and a second end adapted to mount to a portion of the axle assembly whereby the first trailing arm diverges in one direction with respect to the longitudinal axis of the vehicle;

a second trailing arm having a first end pivotally connected to the hanger bracket for movement of the second trailing arm in a second plane at a second acute angle substantially greater than zero relative to the vehicle longitudinal axis when the trailing arm suspension is mounted to the vehicle frame and a second end adapted to mount to a portion of the axle assembly, the second acute angle diverging in a direction opposite the one direction with respect to the longitudinal axis of the vehicle, whereby the second trailing arm diverges in a direction opposite the one direction with respect to the longitudinal axis of the vehicle; and wherein the angular orientation between the first and second planes is the sum of the first and second acute angles.

2. A trailing arm suspension according to claim 1 wherein the first and second trailing arms are mounted to the hanger brackets through elastomeric bushings.

3. A trailing arm suspension according to claim 1 wherein the first trailing arm first end is pivotally connected to the hanger bracket above the second trailing arm first end.

4. A trailing arm suspension according to claim 3 wherein the first ends of the first and second trailing arms are vertically spaced from each other on the hanger bracket.

5. A trailing arm suspension according to claim 3 wherein the first plane acute angle and the second plane acute angle are substantially equal and diverge relative to each other to form a V-shaped configuration in plan view.

6. A trailing arm suspension according to claim 5 wherein the first and second trailing arms diverge from each other at the first ends thereof.

7. A lift axle suspension for a vehicle having a vehicle frame, the lift axle suspension comprising:
   a hanger bracket having an upper end and a lower end and the upper end being adapted to mount to the vehicle frame;
   an axle assembly adapted to rotatably mount tires;
   an upper trailing arm having a first end pivotally connected to the hanger bracket and a second end pivotally connected to the axle assembly;
   a lower trailing arm having a first end pivotally connected to the hanger bracket and a second end pivotally connected to the axle assembly;
   a lift bag having a first end connected to one of the upper and lower trailing arms between the hanger bracket and the axle assembly and a second end connected to one of the hanger bracket and axle assembly, the lift bag being operable between a deflated position and an inflated position; and
   the hanger bracket, axle assembly, and upper and lower trailing arms define a parallelogram suspension having four corners formed by the pivotal connections of the first and second ends of the upper and lower trailing arms;
   whereby when the lift bag moves from the deflated position to the inflated position, the axle assembly is moved from a lowered position in which wheels on the axle assembly are adapted to be in ground engaging contact to a raised position in which the wheels on the axle assembly are adapted to be above ground engaging contact.

8. A lift axle suspension according to claim 7 wherein the upper trailing arm has a longitudinal axis defined by a line passing through the pivotal connections of the upper trailing arm first and second ends, the upper trailing arm longitudinal axis defines a first angle with respect to a vertical line passing through the pivotal connection of the upper trailing arm first end, and the first angle increases as the axle assembly is moved between the lowered and raised positions.

9. A lift axle suspension according to claim 7 wherein the lower trailing arm has a longitudinal axis defined by a line passing through the pivotal connections of the lower trailing arm first and second ends, the lower trailing arm longitudinal axis defines a second angle with respect to a vertical line passing through the pivotal connection of the lower trailing arm second end, and the second angle increases as the axle assembly is moved between the lowered and raised positions.

10. A lift axle suspension according to claim 7 wherein the axle assembly comprises a mounting plate and the first end of the lift bag is connected to the lower trailing arm and the second end of the lift bag is connected to the mounting plate.

11. A lift axle suspension according to claim 10 wherein the mounting plate extends from the axle assembly at a position between the pivotal connections of the second ends of the upper and lower trailing arms.

12. A lift axle suspension according to claim 11 wherein the axle assembly further comprises:
   an axle with an upper and lower portion;
   a mounting bracket provided on the upper portion of the axle;
   an axle seat provided on the lower portion of the axle; and
   wherein the second end of the upper trailing arm is pivotally mounted to the mounting bracket and the second end of the lower trailing arm is pivotally mounted to the axle seat.

13. A lift axle suspension according to claim 12 wherein a portion of the mounting plate is disposed between the mounting bracket and the upper portion of the axle to mount the mounting plate to the axle assembly.

14. A lift axle suspension according to claim 13 and further comprising a shock absorber having one end mounted to the hanger bracket and another end mounted to the mounting plate.

15. A lift axle suspension according to claim 13 and further comprising an air spring having one end adapted to be mounted to a vehicle frame and another end mounted to the axle upper portion.

16. A lift axle suspension according to claim 7 wherein the first end of the lift bag is connected to the hanger bracket and the second end of the lift bag is connected to the upper trailing arm.

17. A lift axle suspension according to claim 16 wherein the hanger bracket comprises a mounting bracket, the upper trailing arm comprises a mounting bracket, and the first end of the lift bag is mounted to the hanger bracket mounting bracket and the second end of the lift bag is mounted to the upper trailing arm mounting bracket.

18. A lift axle suspension for a vehicle having a vehicle frame, the lift axle suspension comprising:
   a hanger bracket having an upper end and a lower end and the upper end being adapted to mount to the vehicle frame;
   an axle assembly adapted to rotatably mount tires and having a mounting plate;
   an upper trailing arm having a first end pivotally connected to the hanger bracket and a second end pivotally connected to the axle assembly;
   a lower trailing arm having a first end pivotally connected to the hanger bracket and a second end pivotally connected to the axle assembly;
   a lift bag having a first end connected to the lower trailing arm and a second end connected to the mounting plate, the lift bag being operable between a deflated position and an inflated position; and
   the hanger bracket, axle assembly, and upper and lower trailing arms define a parallelogram suspension having four corners formed by the pivotal connections of the first and second ends of the upper and lower trailing arms;
   whereby when the lift bag moves from the deflated position to the inflated position, the axle assembly is moved from a lowered position in which wheels on the axle assembly are adapted to be in ground-engaging contact to a raised position in which the wheels on the axle assembly are adapted to be in ground-engaging contact.

19. A lift axle suspension according to claim 18 wherein the mounting plate extends from the axle assembly at a position between the pivotal connections of the second ends of the upper and lower trailing arms.

20. A lift axle suspension according to claim 19 wherein the axle assembly further comprises:
- an axle with an upper and lower portion;
- a mounting bracket provided on the upper portion of the axle;
- an axle seat provided on the lower portion of the axle; and
- wherein the second end of the upper trailing arm is pivotally mounted to the mounting bracket and the second end of the lower trailing arm is pivotally mounted to the axle seat.

21. A lift axle suspension according to claim 20 wherein a portion of the mounting plate is disposed between the mounting bracket and the upper portion of the axle to mount the mounting plate to the axle assembly.

22. A lift axle suspension according to claim 20 and further comprising a shock absorber having one end mounted to the hanger bracket and another end mounted to the mounting plate.

23. A lift axle suspension according to claim 20 and further comprising an air spring having one end adapted to be mounted to a vehicle frame and another end mounted to the axle upper portion.

* * * * *